United States Patent
Seok et al.

(10) Patent No.: US 9,614,938 B2
(45) Date of Patent: Apr. 4, 2017

(54) METHOD AND APPARATUS FOR INDICATING A FRAME TYPE USING A PREAMBLE

(71) Applicant: LG ELECTRONICS INC., Seoul (KR)

(72) Inventors: Yong Ho Seok, Anyang-si (KR); Hyang Sun You, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 14/353,015

(22) PCT Filed: Oct. 18, 2012

(86) PCT No.: PCT/KR2012/008530
§ 371 (c)(1),
(2) Date: Apr. 18, 2014

(87) PCT Pub. No.: WO2013/058569
PCT Pub. Date: Apr. 25, 2013

(65) Prior Publication Data
US 2014/0247838 A1    Sep. 4, 2014

Related U.S. Application Data

(60) Provisional application No. 61/548,692, filed on Oct. 18, 2011, provisional application No. 61/700,895, filed on Sep. 14, 2012.

(51) Int. Cl.
*H04L 29/06* (2006.01)
*H04L 29/08* (2006.01)
(Continued)

(52) U.S. Cl.
CPC ............ *H04L 69/22* (2013.01); *H04L 1/0028* (2013.01); *H04L 1/0039* (2013.01); *H04L 1/16* (2013.01);
(Continued)

(58) Field of Classification Search
CPC ....... H04L 12/56; H04L 27/26; H04L 5/0091; H04L 27/2602; H04L 27/2613;
(Continued)

(56) References Cited

U.S. PATENT DOCUMENTS 7,324,605 B2 * 1/2008 Maltsev .................. H04L 27/26
375/260
8,989,102 B2 * 3/2015 Kenney ............... H04L 27/2613
370/252

(Continued)

FOREIGN PATENT DOCUMENTS

KR 10-2007-0033287 A    3/2007
KR 10-2008-0074854 A    8/2008
(Continued)

OTHER PUBLICATIONS

"A Technical Tutorial on the IEEE 802.11 Protocol", Pablo Brenner, Director of Engineering, Breezecom Wireless Communications, Jul. 18, 1996.

*Primary Examiner* — Jianye Wu
(74) *Attorney, Agent, or Firm* — Dentons US LLP

(57) ABSTRACT

Disclosed are a method and a device for transmitting a data block. The method involves generating and transmitting a physical layer protocol data unit (PPDU) that includes a short training field, a long training field and a signal field. The signal field includes a frame type field that has a length of one bit and indicates whether the PPDU includes a control medium access control (MAC) frame. The device is capable of performing the method.

8 Claims, 8 Drawing Sheets

(A) PHY SU packet (B) PHY MU packet

(51) Int. Cl.
*H04L 5/00* (2006.01)
*H04L 27/26* (2006.01)
*H04W 74/00* (2009.01)
*H04L 1/00* (2006.01)
*H04L 1/16* (2006.01)
*H04W 48/20* (2009.01)

(52) U.S. Cl.
CPC ........ *H04L 5/0091* (2013.01); *H04L 27/2602* (2013.01); *H04L 27/2613* (2013.01); *H04L 69/321* (2013.01); *H04W 74/00* (2013.01); *H04L 1/1621* (2013.01); *H04W 48/20* (2013.01); *Y02B 60/50* (2013.01)

(58) Field of Classification Search
CPC ..... H04L 69/02; H04L 69/321; H04L 1/0028; H04L 1/0039; H04L 1/16; H04L 1/1621; H04W 48/20; H04W 74/00; Y02B 60/502
USPC .......................................... 370/344; 375/299
See application file for complete search history.

(56) References Cited

U.S. PATENT DOCUMENTS

| | | | | |
|---|---|---|---|---|
| 2005/0152473 A1* | 7/2005 | Maltsev | ................ | H04L 27/26 375/299 |
| 2007/0058566 A1* | 3/2007 | Frederiks | .............. | H04L 1/0041 370/253 |
| 2007/0171933 A1* | 7/2007 | Sammour | ......... | H04W 74/0816 370/447 |
| 2008/0181156 A1* | 7/2008 | Ecclesine | .......... | H04W 52/0235 370/311 |
| 2010/0309834 A1* | 12/2010 | Fischer | ................ | H04B 7/0452 370/312 |
| 2011/0305176 A1* | 12/2011 | Wentink | ................ | H04L 1/1607 370/310 |
| 2012/0243485 A1* | 9/2012 | Merlin | .................. | H04W 28/20 370/329 |
| 2013/0279381 A1* | 10/2013 | Sampath | ............... | H04W 56/00 370/311 |

FOREIGN PATENT DOCUMENTS

| | | |
|---|---|---|
| KR | 10-2009-0080551 A | 7/2009 |
| KR | 1020110051129 A | 5/2011 |
| KR | 10-2011-0102845 A | 9/2011 |

* cited by examiner

FIG. 7

| frame type (700) | MCS (720) | . . . . |

METHOD AND APPARATUS FOR INDICATING A FRAME TYPE USING A PREAMBLE

This application is a National Stage entry of International Application No. PCT/KR2012/008530, filed on Oct. 18, 2012, which claims priority to U.S. Provisional Application No. 61/548,692 filed Oct. 18, 2011 and 61/700,895 filed Sep. 14, 2012, all of which are incorporated herein in their entirety by reference.

BACKGROUND OF THE INVENTION

Field of the Invention

The present invention concerns wireless communications, and more specifically, methods and apparatuses of indicating the type of a frame.

Related Art

Machine-to-machine (M2M) systems draw attention as next-generation communication technology and are being standardized in order to be supported by IEEE 802.11 WLAN. M2M system means a network in which a machine, not a human being, serves to perform communication to send and receive information. A temperature sensor, moisture sensor, camera, home appliance, such as a TV, and a bulky machine such as a factory machine or vehicle, may be an M2M element. Recently, as various communication services such as smart grid, e-Health, and ubiquitous, appear, M2M techniques are put to use to support such services. M2M system has the following characteristics.

1) Many stations: M2M assumes a great number of stations unlike existing networks because sensors installed in the home or business, as well as machines owned by individuals need to be also taken into account. Accordingly, a significant number of stations may be linked to a single AP.

2) Low traffic load per station: Since an M2M terminal has a traffic pattern in which it collects ambient information and reports it, it need not often send information and it send a relatively small amount of information.

3) Uplink-centered: M2M has a structure in which it receives a command on downlink, takes action, and then reports a result on uplink. Main data is normally sent on uplink, and thus, M2M is uplink-centered.

4) Long-lifespan station: An M2M terminal is primarily battery-powered, and a user has difficulty in often recharging. Accordingly, it is required to guarantee long lifespan by minimizing battery consumption.

5) Automatic restoration function: An M2M terminal is difficult for a human being to directly manipulate under a specific situation, and thus, it requires a self-restoration function.

SUMMARY OF THE INVENTION

An object of the present invention is to provide a method of indicating a frame type using a PLCP (physical layer convergence procedure) header.

Another object of the present invention is to provide an apparatus of performing a method of indicating a frame type using a PLCP header.

To achieve the above-objects of the present invention, according to an aspect of the present invention, a method of determining a frame type using a physical layer convergence protocol (PLCP) header comprises obtaining information indicating a physical service data unit (PSDU) of the frame by demodulating the frame type included in a signal (SIG) of the physical layer convergence protocol (PLCP) header; and obtaining frame information that is information necessary to demodulate the frame included in the SIG dependently in the information indicating the PSDU, wherein the SIG is a field including different contents depending on the frame type information.

The method of determining the frame type using the PLCP header may further comprise determining whether to demodulate information coming subsequent to the frame type or to switch a sleep mode based on the information indicating the PSDU. Obtaining the information indicating the PSDU of the frame by demodulating the frame type included in the SIG of the PLCP header may include determining the frame as a beacon frame when a value of the demodulated frame type is 0; and determining the frame as a frame other than the beacon frame when the value of the demodulated frame type is 1. Obtaining the information indicating the PSDU of the frame by demodulating the frame type included in the SIG of the PLCP header may include determining the frame as a probe response frame when a value of the demodulated frame type is 0; and determining the frame as a frame other than the probe response frame when the value of the demodulated frame type is 1. Obtaining the frame information included in the SIG dependently in the information indicating the PSDU may include demodulating information coming subsequent to the frame type included in the SIG; and when the frame type has a specific value, obtaining the demodulated information coming subsequent to the frame type as MAC address information. Obtaining the information indicating the PSDU of the frame by demodulating the frame type included in the SIG of the PLCP header may include obtaining information on the PSDU based on a first bit group generated by demodulating the frame type; and obtaining different frame information by demodulating a bit value of a second bit group indicating the different frame information depending on a bit value of the first bit group, wherein the first bit group and the second bit group are a unit including at least one consecutive bit among bits assigned to the SIG. The second bit group is information indicating an MCS of the frame when the first bit group includes 00, 01, and 10, and wherein when the first bit group is 11, the second bit group is information additionally indicating the PSDU and indicates what management frame the frame is.

To achieve the above-described objects of the present invention, according to an aspect of the present invention, a wireless terminal determining a frame type using a physical layer convergence protocol (PLCP) header comprises a processor, wherein the processor obtains information indicating a physical service data unit (PSDU) of the frame by demodulating the frame type included in a signal (SIG) of the PLCP header and obtains frame information that is information necessary to demodulate the frame included in the SIG dependently in information indicating the PSDU, wherein the SIG includes different contents depending on the frame type information. The processor is configured to determine whether to demodulate information coming subsequent to the frame type or to switch to a sleep mode based on the information indicating the PSDU. The processor determines the frame as a beacon frame when a value of the demodulated frame type is 0 and determines the frame as a frame other than the beacon frame when the value of the demodulated frame type is 1 to obtain the information indicating the PSDU of the frame. The processor determines the frame as a probe response frame when a value of the demodulated frame type is 0 and determines the frame as a frame other than the probe response frame when the value of the demodulated frame type is 1 to obtain the information indicating the PSDU of the frame. The processor is configured to demodulate information coming subsequent to the frame type included in the SIG, and when the frame type has a specific value, is configured to obtain the demodulated information coming subsequent to the frame type as MAC address information to obtain the frame information included in the SIG dependently in the information indicating the PSDU. The processor is configured to obtain information on the PSDU based on a first bit group generated by demodulating the frame type to obtain the information indicating the PSDU of the frame and is configured to obtain different frame information by demodulating a bit value of a second bit group indicating the different frame information depending on a bit value of the first bit group, wherein the first bit group and the second bit group include at least one consecutive bit among bits assigned to the SIG. The second bit group is information indicating an MCS of the frame when the first bit group includes 00, 01, and 10, and wherein when the first bit group is 11, the second bit group is information additionally indicating the PSDU and indicates what management frame the frame is.

By a method and apparatus of indicating a frame type according to an embodiment of the present invention, as described above, frame type information is contained in a field of a PLCP header, so that the information on the type of a received frame may be obtained by demodulating only the PLCP header. Accordingly, decoding efficiency may be increased, and unnecessary power consumption may be reduced by eliminating the need of additionally demodulating unnecessary information.

BRIEF DESCRIPTION OF THE DRAWINGS

FIG. 7 is a concept view illustrating an example of indicating a frame type additionally using other subfields included in an SIG according to an embodiment of the present invention.

DESCRIPTION OF EXEMPLARY EMBODIMENTS

Figure 1:
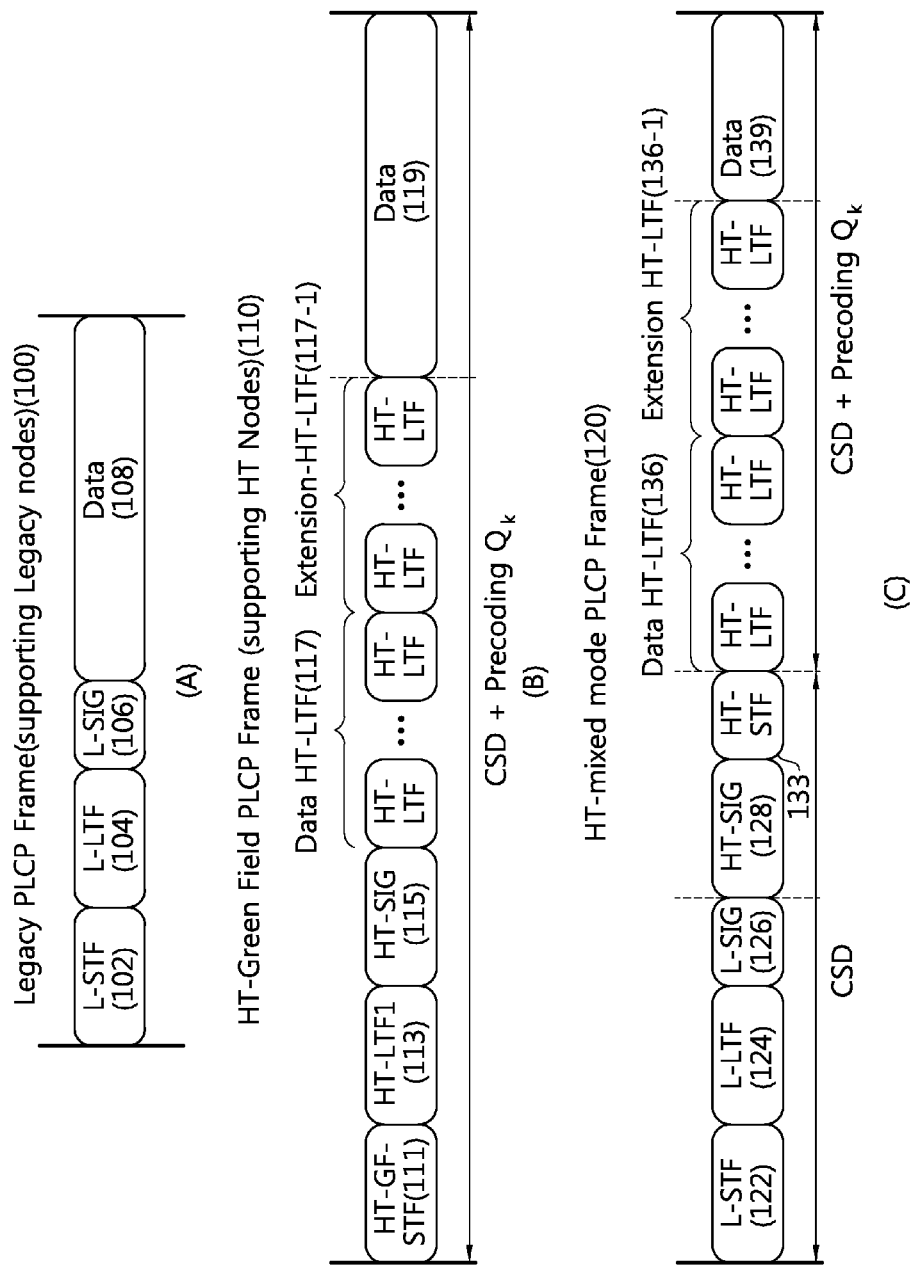
FIG. 1 is a concept view illustrating the frame format of a physical layer convergence procedure (PLCP) protocol data unit (PPDU) defined in the existing IEEE 802.11 standard.

FIG. 1 illustrates frame formats of physical layer convergence procedure (PLCP) protocol data units (PPDUs) defined in the existing IEEE 802.11 standards.

FIG. 1(A) shows the concept of the legacy PLCP frame used in the IEEE 802.11a, IEEE 802.11b, and IEEE 802.11g standards.

Referring to FIG. 1(A), the legacy PLCP frame 100 includes a Legacy Short Training Field (L-STF) 102, a Legacy Long Training Field (L-LTF) 104, a Legacy Signal (L-SIG) 106, and a Data 108.

The L-STF 102 is used for frame timing acquisition and automatic gain control convergence, and the L-LTF 104 is used for, e.g., channel estimation to demodulate the L-SIG 106 and the data field 108. The L-SIG 106 contains information for demodulating and decoding the data 108 that is sent subsequent to the SIG 106.

A subsequent standard, IEEE 802.11n High Throughput system (hereinafter, HT system), has been designed to support the legacy PLCP format used in the IEEE 802.11a, 802.11b, and 802.11g standards. IEEE 802.11n has separately defined the frame format that may be used in a system having only HT (high throughput) STA and the frame format that may be used when in IEIEE 802.11n the legacy STA used in the existing IEEE 802.11a, 802.11b, and 802.11g standards and the HT STA newly defined in 802.11n co-exist.

FIG. 1(B) shows the concept of the HT-Green Field PLCP frame 110.

Referring to FIG. 1(B), IEEE 802.11n defines a system consisting only of HT STAs and newly defines the PLCP frame format that may be efficiently used in the system consisting only of HT STAs. Such PLCP frame format is defined as HT-Green Field PLCP format 110.

The HT-Green Field PLCP format 110 includes a HT Green Field Short Training Field (HT-GF-STF) 111, a HT Long Training Field (HT-LTF) 113, a HT Signal (HT-SIG) 115, additional HT-LTFs 117 and 117-1, and Data 119. The HT-GF-STF 111 is used to perform frame timing acquisition and automatic gain control convergence. The HT-LTF 113 is used for performing channel estimation to demodulate the HT-SIG 115 and the data 119. The HT-SIG 115 contains information for demodulating and decoding the data that is transmitted subsequent thereto. The additional HT-LTFs 117 and 117-1 may be additionally included in the frame format in case MIMO (multiple input multiple output) is put to use. In case transmission is carried out to a plurality of STAs using MIMO, the additional HT-LTFs 117 and 117-1 may contain channel estimation information on each STA.

FIG. 1(C) shows the concept of the HT-mixed Mode PLCP frame 120.

Referring to FIG. 1(C), IEEE 802.11n supports a PLCP frame designed to be able to back up HAT in a system where legacy station(s) (hereinafter, STA) and HT STA(s) co-exist. Such frame format is referred to as the HT-mixed mode PLCP frame 120. In the HT-mixed mode PLCP frame 120, an L-STF 122, an L-LTF 124, and an L-SIG 126 are first transmitted so as to support a frame format that may also be understood by a legacy STA. Thereafter, the HT signal (HT-SIG) 128 is transmitted that carries information necessary to demodulate and decode data that is sent for HT. The HT-SIG 128 and its predecessors are sent in a non-beamforming manner so that various STAs including legacy STAs may receive information. The HT-LTF 136 and data 139 that should be sent after the HT-SIG 128 are subjected to signal transmission through precoding. At this time, the HT short training field (HT-STF) 133 is sent and then the HT-LTF 136 and data 139 are sent so that the STA receiving a data frame while fulfilling precoding may consider the part whose power is varied by the precoding.

Figure 2:
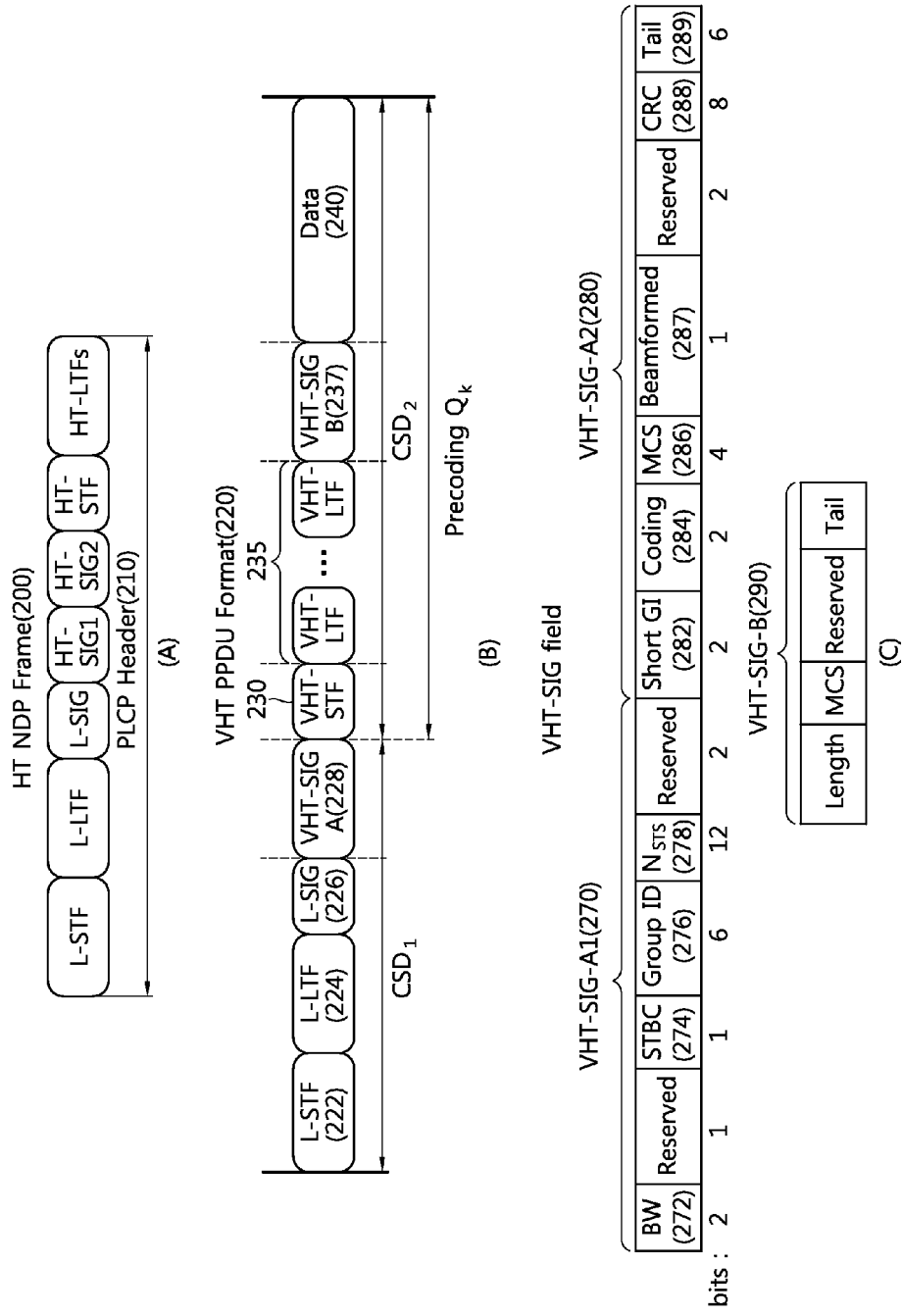
FIG. 2 is a concept view illustrating the frame format of a physical layer convergence procedure (PLCP) protocol data unit (PPDU) defined in the existing IEEE 802.11 standard.

FIG. 2 shows the concept of frame formats of the physical layer convergence procedure (PLCP) protocol data units (PPDUs) defined in the existing IEEE 802.11 standards.

FIG. 2(A) shows the concept of an HT NDP frame 200.

Referring to FIG. 2(A), one major feature of the HT system is that it may lead to an enhanced system throughput by sending a number of spatial streams using multiple antennas. Beamforming to a specific STA to which data transmission is oriented under the circumstance where there are several STAs is required, resulting in the need of a channel sounding scheme. IEEE 802.11n supports two channel sounding schemes. One is a regular PPDU scheme having a data field and an MAC header, and the other is a scheme using an NDP that does not contain a data field. In case channel sounding is fulfilled using NDP, a PPDU frame in which an NDP announcement for announcing NDP is set up needs to be first sent.

The NDP frame is a frame with no data part and may contain its structure PLCP header 210 alone.

FIG. 2(B) illustrates the concept of the VHT PPDU format 220.

Referring to FIG. 2(B), IEEE 802.11ac newly defines the VHT PPDU frame 220. IEEE 802.11ac is a WLAN (wireless local area network) standard that backs up very high throughput (VHT) in a frequency band of 6 GH or less. IEEE 802.11ac supports 1 Gbps of WLAN throughput on a multi-station and supports a maximum throughput of at least 500 Mbps on a link to one STA.

As compared with IEEE 802.11n supporting a channel bandwidth up to 40 MHz, IEEE 802.11ac supports channel bandwidths of 80 MHz and 160 MHz, while supporting a non-contiguous channel bandwidth of 80+80 MHz. In order to support a higher throughput, 1 Gpbs, than a maximum of 450 Mbps supported by IEEE 802.11n, IEEE 802.11ac backs up a maximum of 256 QAM unlike IEEE 802.11n supportive of a maximum of 64-quadrature amplitude modulation (QAM and supports MU (multiple user)-MIMO while IEEE 802.11n supports signal user (SU)-multiple input multiple output (MIMO.

Since IEEE 802.11ac supports MU-MIMO, STAs may have one or more antennas, and IEEE 802.11ac currently supports only downlink MU-MIMO by which packets are transmitted from an AP (access point) to several STAs. Further, the number of packets that may be transmitted at the same time is maximally 4, and when the maximum number of total spatial streams that may be supported is eight, each STA may use up to four streams.

A physical layer to support VHT presently supports MU-MIMO and orthogonal frequency division multiplexing (OFDM). The VHT physical layer supports contiguous channel bandwidths of 20 MHz, 40 MHz, 80 MHz, and 160 MHz and a non-contiguous channel bandwidth of 80+80 MHz. Each subcarrier in the VHT physical layer supports binary phase shift keying (BPSK), quadrature phase shift keying (QPSK), 16-QAM, 64QAM, and 256-quadrature amplitude modulation (QAM) and supports coding rates of 1/2, 2/3, 3/4, and 5/6 through forward error correction (FEC) using convolution codes or Low-density parity-check codes (LDPCs).

A PLCP service data unit (PSDU) is created to transmit packets in the VHT environment, and a physical layer convergence procedure (PLCP) preamble adds up, thereby generating a PLCP protocol data unit (PPDU). The PLCP preamble is used to assist in demodulating and transferring PSDU at the reception end.

The VHT PPDU format 220 contains an L-STF 222, an L-LTF 224, an L-SIG 226, a VHT-SIG-A 228, a VHT-STF 230, VHT-LTFs 235, a VHT-SIG-B 237, and a data field 240. While the L-STF 222, L-LTF 224 and L-SIG 226 are used in the WLAN prior to supporting VHT, the VHT-SIG-A 228, VHT-STF 230, VHT-LTFs 235, and VHT-SIG-B 237 are fields present only in VHT packets.

The newly added fields to support VHT are described. First, the VHT-SIG-A field 228 contains information for describing VHT format packet and has information required for all STAs. The VHT-SIG-A field 228 includes a VHT-SIG-A1 field 270 and a VHT-SIG-A2 field 280. The VHT-SIG-A1 field 270 contains information such as bandwidth 272 of a channel used, whether to use space time block coding (STBC) 274, group ID 276 to represent a group used for transmission in grouped STAs over MU-MIMO, and number of streams used 278. In contrast, the VHT-SIG-A2 field 280 contains information 286 on type of channel coding for multiple users or modulation and coding scheme (MCS) for a single user, beamforming-related information 287, redundancy bits 288 for cyclic redundancy checking (CRC) and tail bits 289 of convolutional decoder.

The VHT-STF 230 is a field provided to enhance automatic gain control estimation in the MIMO environment, and the VHT-LTF 235 is a field provided to estimate channel in the MIMO environment. The VHT-SIG-B field 237 contains information relating to the length of PSDU and MCS and tail bits, as limited to each STA.

FIG. 2(C) shows the VHT-SIG-A 270 and 280 constituted of two symbols and the VHT-SIG-B field 290 constituted of a single symbol. Among these, the detailed field content contained in the VHT-SIG-A1 field 270 is shown in Draft STANDARD for Information Technology—Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz, Ch. 22.3.8.2.3, table 22-11 fields in the VHT-SIG-A field. The detailed content contained in the VHT-SIG-B field 290 is shown in table 22-13.

The embodiments set forth hereinafter disclose PHY (physical) preamble structures (or also denoted as PLCP (physical layer convergence procedure) header) for devices operating in a sub 1 GHz band. The present invention may apply to devices operating in a sub 1 GHz band defined in the IEEE 802.11ah or 802.11af standard such as M2M (machine to machine) systems. However, what is suggested herein is not limited to M2M systems, and without departing from the gist of the present invention, the present invention may also be applicable to general WLAN (wireless local area network) systems (or Wi-Fi networks).

Figure 3:
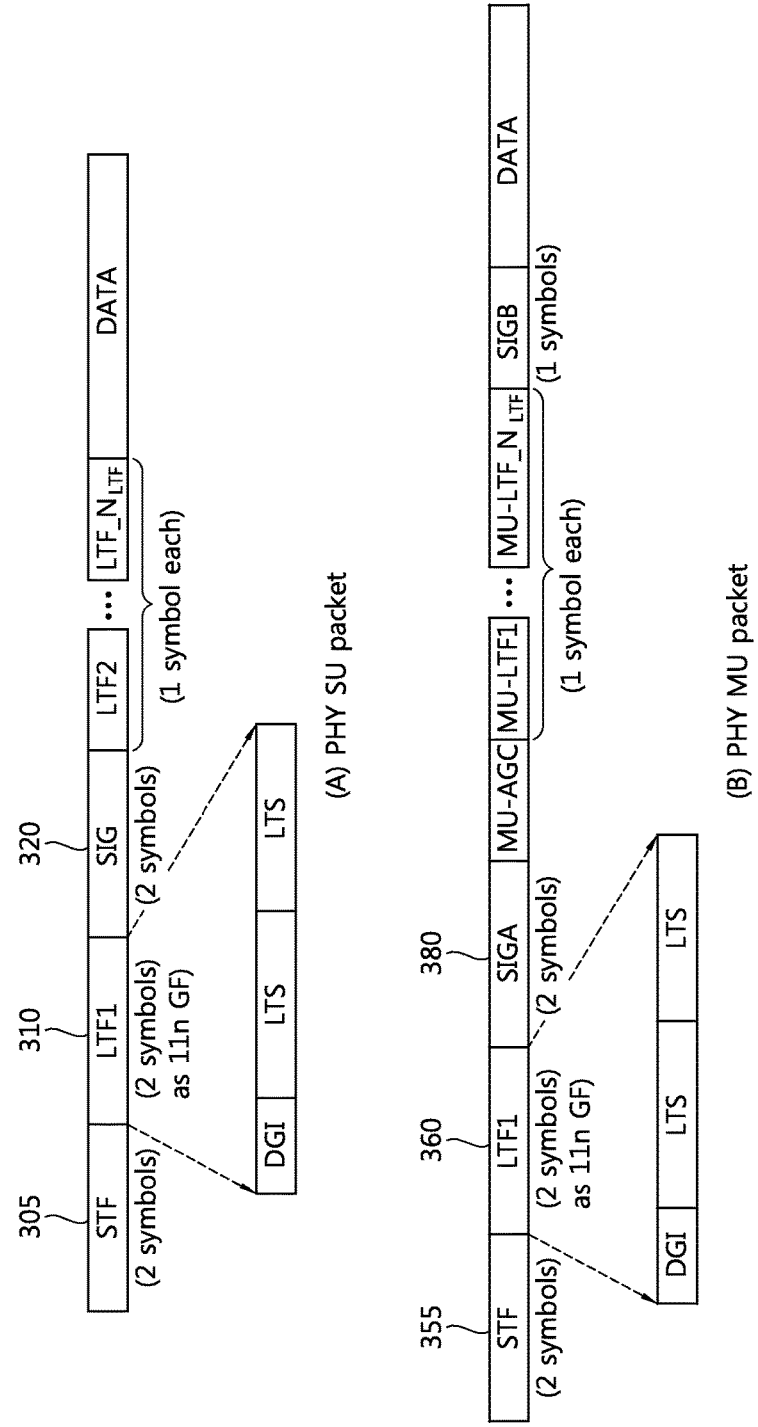
FIG. 3 is a concept view illustrating a sub 1 GHz PLCP header structure according to an embodiment of the present invention.

FIG. 3 illustrates the concept of a sub 1 GHz PLCP header structure according to an embodiment of the present invention.

FIG. 3(A) illustrates the concept of a preamble structure used by a single user, and FIG. 3(B) illustrates the concept of a preamble structure used by multiple users.

In FIGS. 3(A) and 3(B), the STF 305 or 355 and the LTF1 310 or 315 plays a similar role to the HT-GF-STF and HT-LTF1 included in the HT-green field PLCP frame.

In FIGS. 3(A) and 3(B), the SIG 320 or 380 may contain information necessary to demodulate fields coming subsequent to the SIG 320 or 380. Since there is a limit on the number of bits carrying information in the SIG 320 or 380, the SIG 320 or 380 needs to be efficiently designed.

According to an embodiment of the present invention, the SIG 320 or 380 includes an indication bit that allows the type of received frame to be known, and the bit information in the indication bit may be demodulated so that the type of received frame may be previously known through the PLCP header even when the fields subsequent to the SIG 320 or 380 are not demodulated. In order to be aware of the type of the received frame, decoding should be conventionally done on the frame control field of the MAC header and its preceding fields. However, in case the frame type information is present in the SIG 320 or 380 of the PLCP header, demodulation is done only on the SIG 320 or 380 of the PLCP header and its preceding fields for the frame that does not require reception in the STA's position while the following information is not demodulated, thereby minimizing the demodulation process and reducing power consumption. Hereinafter, the process of receiving and interpreting data is referred to as demodulation. That is, "demodulation" may be used as the common term including a process of construing data of a received frame such as deinterleaving or decoding.

The field indicating the frame type included in the SIG 320 or 380 may be defined as frame type subfield or frame type. Hereinafter, embodiments of such frame type subfield (or frame type) are described. However, the scope of the present invention is not limited to the embodiments set forth below and may also contain a method by which the SIG includes information that may represent the frame type information and it is determined whether to demodulate additional information of the frame depending on such information. Accordingly, without departing from the scope of the present invention, what is indicated may vary depending on the name or value of field, so that the detailed content indicated per field name or value is merely an example.

Further, according to an embodiment of the present invention, after the type of frame is indicated by the SIG, bits additionally demodulated may have different types of content depending on the frame type. For example, in case the frame type information in the SIG contains a specific value, the bits present at specific locations included in the SIG may be interpreted as address information to indicate the transmission end or reception end. In case there are different pieces of frame type information, the bits positioned at the same location may be used to be construed as other content, not address information.

Figure 4:
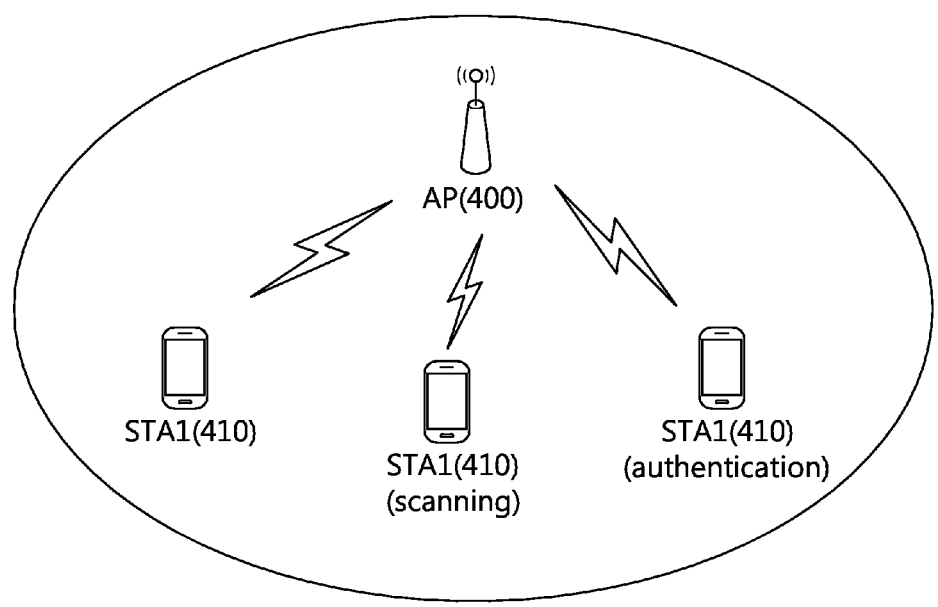
FIG. 4 is a concept view illustrating a plurality of STAs included in the coverage of a single AP according to an embodiment of the present invention.

FIG. 4 is a concept view illustrating a plurality of STAs included in the coverage of a single AP according to an embodiment of the present invention.

Referring to FIG. 4, there may be STAs having various states 410, 420, and 430 in communication with an AP in a sub 1 GH band, 1) the STA 410 in active mode that, after associated with the AP 400, transmits and receives data, 2) the STA 420 that wakes up from sleep mode to active mode to perform passive scanning based on a beacon frame, and 3) the STA 430 that performs scanning/authentication/association prior to association such as a scanning process including transmitting a probe request frame to the AP 400 and waiting to receive a probe response frame. In the scanning/authentication/association process, various management frames may be used. Among them, management frames such as a beacon frame, probe request frame, and probe response frame used in the scanning process are set forth in IEEE 802.11, Ch. 8.3.3.

Sub 1 GHz band communication, in light of the nature of radio waves, provides significantly broad coverage as compared with the existing indoor-centered WLAN. Accordingly, IEEE 802.11ah may have many STAs in the coverage of a single AP thanks to a broad coverage M2M environment, and a number of broadcast frames transmitted from many STAs should be received by the AP. If predetermined management frames are used in the scanning/authentication/ association processes between the STA and the AP, and information on the frame that should be received may be previously known through the PLCP header, the STA may prevent unnecessary power consumption.

Figure 5:
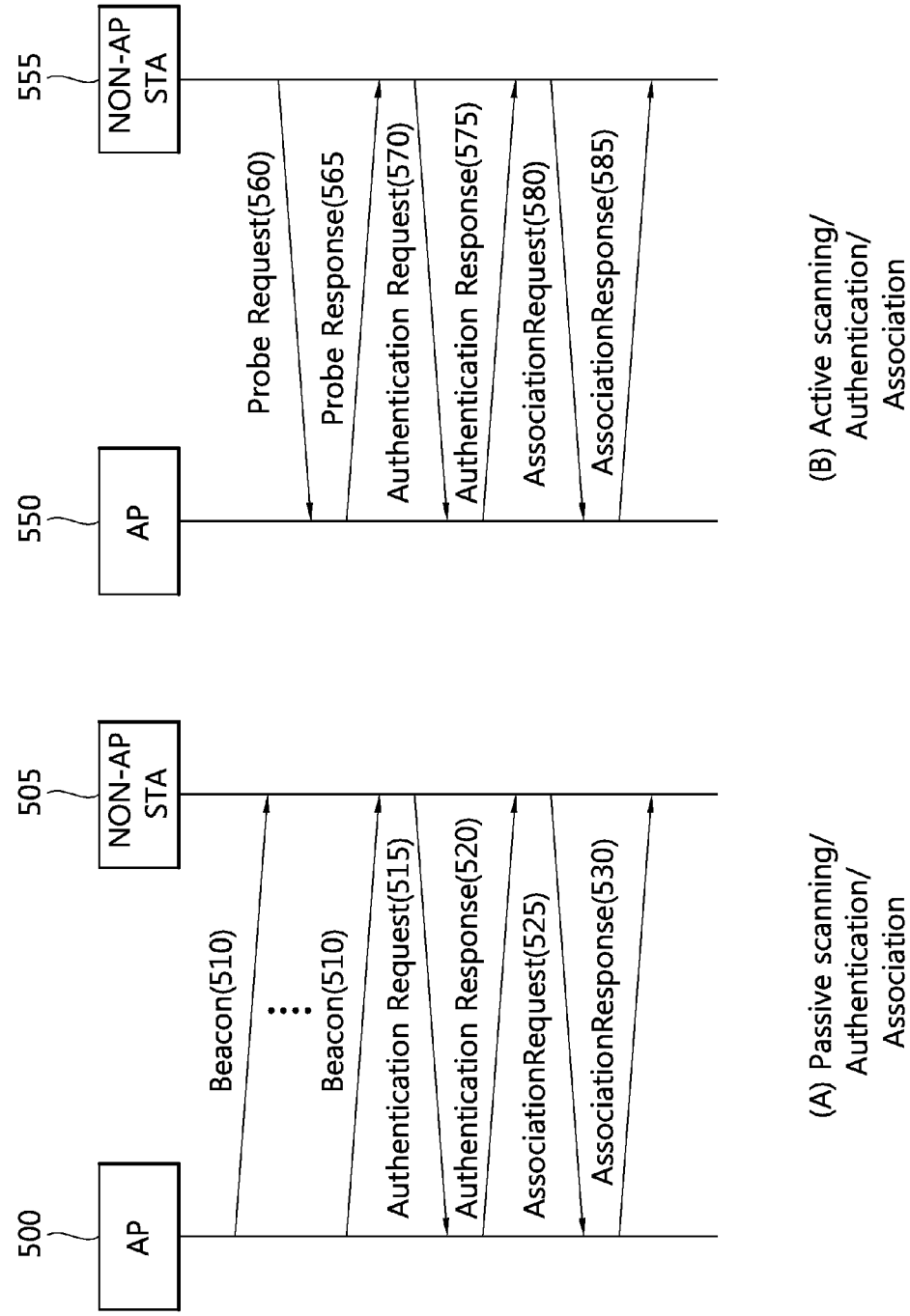
FIG. 5 is a concept view illustrating scanning/authentication/association processes according to an embodiment of the present invention.

FIG. 5 is a concept view illustrating scanning/authentication/association processes according to an embodiment of the present invention.

Referring to FIG. 5, scanning methods may be divided into a passive scanning method (A) and an active scanning method (B).

Referring to FIG. 5(A), the passive scanning method may be performed by a beacon frame 510 that is periodically broadcast by the AP 500. In the WLAN, the AP 500 broadcasts the beacon frame 510 to the non-AP STA 505 every 100 msec. The beacon frame 510 may contain information on the current network. The non-AP STA 505 may conduct scanning on the channel with the AP 500 that is to perform the authentication/association processes by receiving the beacon frame 510 periodically broadcast and resultantly receiving the network information.

According to an embodiment of the present invention, the non-AP STA 505 performing passive scanning may obtain information on whether the received frame is the beacon frame 510 by demodulating the PLCP header. For example, the STA may demodulate the frame type subfield contained in the SIG of the received frame and only when the received frame is a beacon frame, may additionally demodulate the received frame.

Referring to FIG. 5(B), active scanning refers to a method of actively performing scanning by sending a probe request frame 560 from the non-AP STA 555 to the AP 550.

The AP 550 receives the probe request frame 550 from the non-AP STA 555 and then waits a random time to prevent frame collision, then sends a probe response frame 565 including network information to the non-AP STA. The non-AP STA 555 may obtain network information based on the received probe response frame 565 and may stop the scanning process.

According to an embodiment of the present invention, the STA 555 performing active scanning may obtain information on whether the received frame is the probe response frame 565 by demodulating the PLCP header. For example, the STA 555 may demodulate the frame type subfield included in the SIG of the received frame, and only when the received frame is the probe response frame 565, may additionally demodulate the received frame.

After scanning is terminated, the AP 500 or 550 may conduct authentication and association processes with the STA 505 or 555.

After performing passive/active scanning, authentication and association may be conducted with one of the scanned APs.

The authentication and association processes may be carried out through 2-way handshaking. FIG. 5(A) is a concept view illustrating authentication and association processes after passive scanning, and FIG. 5(B) is a concept view illustrating authentication and association processes after active scanning.

The authentication and association processes, regardless of whether active scanning or passive scanning has been performed, may be carried out by exchanging an authentication request frame 515 or 570/authentication response frame 520 or 575 and an association request frame 525 or 580 and an association response frame 530 or 585 between the AP 500 or 550 and the non-AP STA 505 and 555.

The authentication process may be performed by the non-AP STA 505 or 555 sending an authentication request frame 515 or 570 to the AP 500 or 550. In response to the authentication request frame 515 or 570, an authentication response frame 520 or 575 may be transmitted from the AP 500 or 550 to the non-AP STA 505 or 555. The association process may be conducted by the non-AP STA 505 or 555 sending an association request frame 525 or 580 to the AP 500 or 550. In response to the association request frame 525 or 580, an association response frame 530 or 585 may be sent from the AP 500 or 550 to the non-AP STA 505 or 555.

In case the association process has been performed, normal data transmission and reception are performed subsequently. In case the association process is not performed, association is re-attempted based on the reason why the association has not been performed or association may be performed with other AP.

Information on the management frames used in the authentication/association processes may also be contained in the PLCP header so as to be able to determine whether the information received by the STA includes the frame necessary for the STA's state and to thus determine whether additional information is to be demodulated.

That is, according to the prior art, the frame control field in the MAC header needs to be demodulated in order to be aware of what type of frame is the currently received frame. However, according to the present invention, only SIG in the PLCP header is decoded to obtain frame type subfield information, thereby allowing it to be known what type of frame is the received frame. Accordingly, the STA may fulfill demodulation only on the SIG and its preceding part in the received frame and may determine whether to additionally receive and demodulate information on the frame while remaining in active mode or to switch from active mode to sleep mode.

The frame type is information indicating the type of a frame and may be used as information to interpret what management frame is a current frame as well as information indicating what nature the current frame has. For example, the current frame may indicate a frame of an NDP (null data packet) type which consists only on a PLCP header with no PSDU based on the type field in the frame.

According to an embodiment of the present invention, a method in which the frame type field indicates some management frames has been described for ease of description. However, the frame type field may be interpreted as used as information to identify and indicate a general frame, and embodiments in which such frame type field is used are also included in the scope of the present invention.

Further, according to an embodiment of the present invention, the SIG in the PLCP header may contain additional information as well as the frame type field. For example, the SIG may contain transmission and reception information such as transmission address or receiving address information or other various pieces of information such as type of transmitted data and channel environment. The STA or AP may perform early packing filtering only on the PLCP header of the received frame based on such information to thereby determine whether to additionally decode the received frame.

IEEE 802.11ah may down-clock the existing frame format and use it. In case down-clocking has been conducted, the OFDM symbol length is increased. In case the OFDM symbol length is increased, use of a method of determining whether to perform additional demodulation only with the PLCP header may reduce the time of unnecessarily maintaining active mode, thus resulting in the method of reducing the STA's power consumption being a more efficient method.

For example, the frame structure of a physical layer used in a sub 1 GHz band may be generated by simply 1/10 down-clocking the frame structure used in the existing IEEE 802.11ac standard. In other words, the frame used in 20/40/80/160/80+80 MHz channel bandwidth under the IEEE 802.11ac standard may be 1/10 down-clocked and may be used in 2/4/8/16/8+8 MHz channel bandwidth in the sub 1 GHz band. As it is 1/10 down-clocked, the guard interval (GI) is ten times increased from 0.8 micro sec to 8 micro sec.

Further, assuming the case where a frame is generated by 1/10 down-clocking an IEEE 802.11ac frame, duration of one OFDM (orthogonal frequency division multiplexing) symbol in the 1/10 down-clocked frame may be 40 micro sec, which is ten times the duration of one OFDM symbol, 4 micro sec, in the existing frame that has not undergone 1/10 down-clocking. Accordingly, power saving efficiency obtainable when one OFDM symbol is not decoded in the IEEE 802.11ah environment may be much higher than power saving efficiency obtainable when one OFDM symbol is not decoded.

Hereinafter, frame type fields usable to indicate frame type information included in the SIG of a PLCP header are described according to an embodiment of the present invention. The frame type fields usable to indicate frame type information included in the SIG of the PLCP header are merely an example and may also be used to indicate other frame types. The value in the field is an arbitrary value, and the relationship between the field value and what is indicated by the field value is also an example.

The following table, Table 1, represents frame type subfields included in the SIG.

TABLE 1

| Subfield value | Subfield description |
| --- | --- |
| 0 | The subfield value is set to 0 for indicating this frame is a beacon frame or probe response frame |
| 1 | Otherwise, the subfield value is set to 1 |

Referring to Table 1, the SIG may contain a 1-bit frame type subfield, e.g., to indicate frame type information of a received frame.

In case the frame type subfield value is 0, it indicates that the received frame is a beacon frame or probe response frame, and in case the frame type subfield value is 1, it indicates that the received frame has other frame format.

For example, as a result of having demodulated the SIG and its preceding part of the frame received by the STA performing the scanning process, in case the frame type subfield value is 0, the received frame may be additionally demodulated or additional frame information may be received and a step subsequent to the scanning process—authentication step—may be performed. However, as a result of having demodulated the SIG and its preceding part of the frame received by the STA performing the scanning process, in case the frame type subfield value is 1, the STA may be aware that the received frame is not a beacon frame or probe response frame. Accordingly, the STA may switch from active mode to sleep mode without decoding additional fields in the received frame.

Based on the result of interpreting the SIG and its preceding part, content according to the remaining demodulated bits may be construed differently. That is, the content included in the SIG according to the position of a bit in the probe response frame and beacon frame may have different values.

The following Tables 2 and 3 represent an example of determining only whether a frame is a beacon frame in the frame type subfield and an example of determining only whether a frame is a probe response frame in the frame type subfield Table 2 represents a frame type subfield included in an SIG.

TABLE 2

| Subfield value | Subfield description |
| --- | --- |
| 0 | The subfield value is set to 0 for indicating this frame is a beacon frame |
| 1 | Otherwise, the subfield value is set to 1 |

Referring to Table 2, a frame type subfield may be separately defined only for a beacon frame. In case the frame type subfield value is 0, this indicates that a received frame is a beacon frame, and in case the frame type subfield value is 1, this may indicate that a received frame is a frame other than the beacon frame.

In case the STA uses passive scanning based on Table 2, only the frame type subfield and its preceding subfield may be demodulated so that it may be known whether the received frame is a beacon frame. Based on the result of interpreting the SIG and its preceding part, content according to the remaining demodulated bits may be construed differently. That is, in case the frame type is 0, the received frame may be demodulated by the definition of other SIG field corresponding to the beacon frame as the beacon frame.

Table 3 represents a frame type subfield included in an SIG.

TABLE 3

| Subfield value | Subfield description |
| --- | --- |
| 0 | The subfield value is set to 0 for indicating this frame is a probe response frame |
| 1 | Otherwise, the subfield value is set to 1 |

Referring to Table 3, a frame type subfield may be separately defined only for a probe response frame. In case the frame type subfield value is 0, this indicates that the received frame is a probe response frame, and in case the frame type subfield value is 1, this may indicate that the received frame is a frame other than the probe response frame.

Based on Table 3, in case the STA uses active scanning, the frame type subfield and its preceding subfields only are demodulated so that it may be known whether the received frame is a probe response frame. Likewise, based on the result of interpreting the SIG and its preceding part, content according to the remaining demodulated bits may be construed differently.

According to an embodiment of the present invention, two bits may be assigned to the frame type subfield in the PLCP header thereby to allow for indicating the type of the frame. The following table 4 represents a method of indicating management frames used in a scanning process using two bits.

TABLE 4

| Subfield value | Subfield description |
| --- | --- |
| 00 | The subfield value is set to 00 for indicating this frame is a beacon frame or probe response frame |
| 01 | The subfield value is set to 01 for indicating this frame is a STA advertising frame |
| 10 | The subfield value is set to 10 for indicating this frame is a management frame except beacon frame, probe response frame, and STA advertising frame |
| 11 | The subfield value is set to 11 for indicating this frame is not a management frame |

Referring to Table 4, in case the frame type subfield value is 00, the STA may indicate that a received frame is a beacon frame or probe response frame. The STA, under the scanning process, decodes additional fields in the received frame in case the frame type subfield value is 00. When not in the scanning process, the STA may immediately switch to sleep mode rather than decoding additional fields in the received frame in case the frame type subfield in the received frame is 00.

In case the frame type subfield is 01, it can be seen that the received frame is an STA advertising frame. The STA advertising frame may be used, e.g., for the STA operating under M2M environments to advertise to the AP various information such as its own information (e.g., MAC address), information relating to data to be sent after association, and channel information.

Further, according to an embodiment of the present invention, other additional information as well as the frame type subfield may be included in the SIG. For example, the STA's MAC address information may be contained in the SIG of the STA advertising frame. By using such method, when receiving the advertising frame broadcast by the STA, the AP may do early packet filtering on information indicating the STA, thereby determining whether to further decode additional information.

In case the frame type subfield is 01, it can be indicated that the received frame is a management frame other than the beacon frame, probe response frame, and STA advertising frame. For example, in case the received frame is a management frame except the beacon frame, probe response frame, and STA advertising frame used in the scanning/authentication/association processes between the STA and the AP, early packet filtering may be conducted on the frame type subfield of the PLCP header, so that additional decoding may be fulfilled only when the frame fits the STA's current state.

In case the frame type subfield is 11, it can be indicated that the received frame is not a management frame.

Likewise, based on the result of interpreting the SIG and its preceding part, content according to the remaining demodulated bits may be interpreted differently.

The following Table 5 shows a method of representing type information of a received frame based on a two-bit frame type subfield in an SIG.

TABLE 5

| Subfield value | Subfield description |
| --- | --- |
| 00 | The subfield value is set to 00 for indicating this frame is a beacon frame |
| 01 | The subfield value is set to 01 for indicating this frame is a probe response frame |
| 10 | The subfield value is set to 10 for indicating this frame is a STA advertising frame |
| 11 | Otherwise, the subfield value is set to 11 |

Referring to Table 5, a beacon frame and a probe response frame may be distinctively indicated by frame type values.

In case the frame type value is 00, this indicates that the received frame is a beacon frame. The STA, under passive scanning, needs to receive a beacon frame as a frame transmitted from the AP. Under passive scanning, the STA may decode information subsequent to the SIG only on the beacon frame among the received frames.

In case the frame type value is 01, this indicates that the received frame is a probe response frame. Under active scanning, the STA should receive a probe response frame from the AP as a response to the probe request frame sent to the AP. The STA in the middle of active scanning may decode information subsequent to the SIG only on the probe response frame among the frames received based on the frame type value.

In case the frame type value is 10, this indicates that the received frame is an STA advertising frame. The STA advertising frame may be used, e.g., for the STA operating under M2M environments to advertise to the AP various information such as its own information (e.g., MAC address), information relating to data to be sent after association, and channel information. As described above, according to an embodiment of the present invention, not only the frame type subfield but also other additional information may be contained in the SIG.

In case the frame type value is 11, this may indicate that the received frame is a frame other than the beacon frame, probe response frame, and STA advertising frame.

Likewise, based on the result of interpreting the SIG and its preceding part, content according to the remaining demodulated bits may be construed differently.

Figure 6:
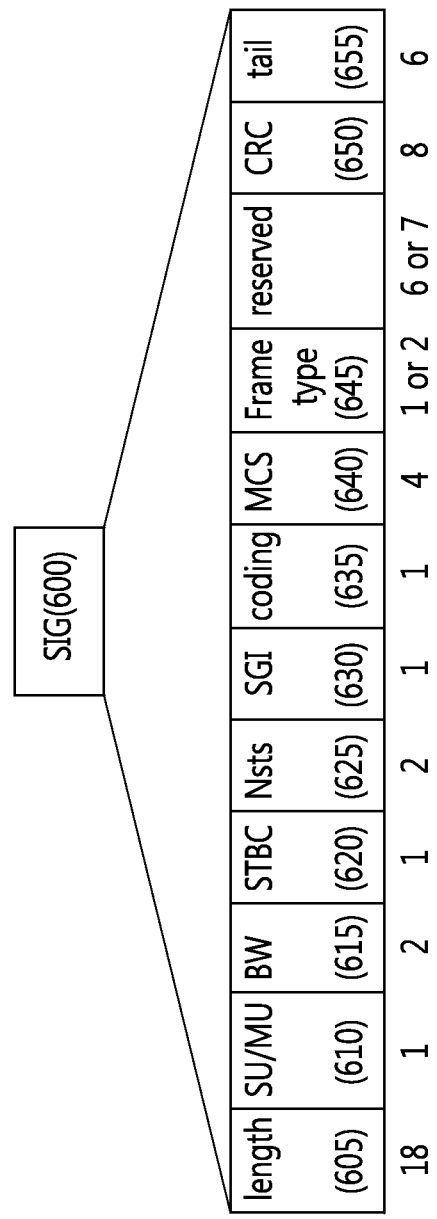
FIG. 6 is a concept view illustrating an SIG according to an embodiment of the present invention.

FIG. 6 is a concept view illustrating an SIG according to an embodiment of the present invention.

Referring to FIG. 6, the SIG 600 may include a Length 605, a SU/MU 610, a BW 615, a STBC 620, a Nsts 625, a Short GI 630, a Coding 675, a MCS 640, a frame type 645, a reserved, a CRC 650, and a tail 655.

The subfields shown in FIG. 6 are merely an example of information that may be contained in an SIG. According to an embodiment of the present invention, in case the SIG contains a subfield having type information of a frame, such as frame type 645, such frame format belongs to the scope of the present invention. Further, the SIG field may additionally include a subfield such as frame type 645 that may determine whether to additionally decode a received frame through early packet decoding at the reception side.

Among the fields that may be included in the SIG 600, Length 605 may contain length information of a current frame. SU/MU 610 may be used as information indicating whether a received frame is a frame transmitted to a single user or to multiple users. BW 615 may contain information on a frequency bandwidth where a frame is transmitted.

STBC 620 may contain information indicating whether a frame has used STBC (space time block coding). Nsts 625 may contain information on the number of space time streams used for transmitting data. Nsts 625 may have different pieces of information mapped depending on whether the stream is for a single user or multiple users. For example, in the case of a stream for a single user, Nsts may further contain information indicating an STA where a frame is transmitted in addition to information on the number of streams.

Short GI 630 may indicate information on whether a short guard interval or long guard interval has been used as guard interval of a frame. Coding 635 may contain information on a coding method that has applied to a frame. For example, low density parity check (LDPC) coding and binary convolutional coding (BCC), etc., may be used as methods of coding frames, and a coding method used for a frame may be indicated through coding 635.

MCS 640 may indicate the type of a modulation and coding scheme that has been used for a frame.

Frame type 645 may be used as information indicating the type of a current frame as set forth above in connection with Tables 1 to 4. The frame type information may distinguish management frames from non-management frames based on the one-bit or two-bit information as set forth in Tables 1 to 4. Further, among the management frames, a beacon frame, a probe response frame, or an STA advertising frame may be distinguished.

After decoding the frame type 645 and its preceding part in the SIG, the STA may determine whether to additionally decode the received frame or stop decoding to switch to sleep mode.

The following Table 6 represents the bit counts assigned to subfields in an SIG.

TABLE 6

| Subfield in SIG | [bits] |
| --- | --- |
| Length(SU) | 18 |
| Tail | 6 |
| CRC | 8 |
| MCS | 4 |
| BW(2, 4, 8, 16[MHz]) | 2 |
| STBC | 1 |
| Coding | 1 |
| Short GI | 1 |
| Nsts | 2 |
| SU/MU | 1 |
| Frame Type | 1 or 2 |
| Reserved | 7 or 6 |
| Total | 52 |

According to an embodiment of the present invention, different subfields included in the SIG to indicate frame type may be adaptively used.

Figure 7:
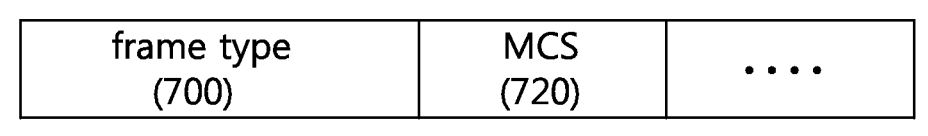

FIG. 7 is a concept view illustrating an example where a frame type 700 is indicated additionally using other subfields included in an SIG according to an embodiment of the present invention. The MCS field 720 is an example and may be additionally used for other subfield to indicate the frame type. That is, the nature of a frame may be identified using the frame type 700, and a specific bit value positioned in an additional SIG field may be interpreted differently.

Referring to FIG. 7, two bits are assigned to the frame type field 700 of the SIG, and four bits are assigned to the MCS 720. The two fields may share some bits. In a certain case, the frame type field 700 and the MCS field 720 may be combined to be used to indicate frame type information.

For example, two bits assigned to b0 and b1 may be used to first classify received frames in two types as shown in Table 7.

TABLE 7

| b0, b1 | Subfield description |
| --- | --- |
| 11 | The subfield value is set to 11, for indicating this frame is a beacon frame, a probe response frame, a STA advertising frame, a CTS frame, an ACK frame, a block ACK frame, a prove request frame or a beam-forming report poll frame. |
| 00, 01, 10 | The subfield value is set to 11 for indicating other frames. |

Referring to Table 7, the bits assigned to b0 and b1 being 11 may indicate that the received frame is one of management frames (a beacon frame, a probe response frame, a STA advertising frame, a CTS frame, a ACK frame, a block ACK frame, prove request frame or beam-forming report poll frame). According to an embodiment of the present invention, assume that the beacon frame, probe response frame, STA advertising frame, CTS frame, ACK frame, block ACK frame, prove request frame or beam-forming report poll frame uses a predetermined MCS value and thus does not require additional MCS information to be given. In such case, the bits assigned to b2, b3, and b4 may be used to identify which one of the beacon frame, probe response frame, STA advertising frame, CTS frame, ACK frame, block ACK frame, prove request frame or beam-forming report poll frame is the received frame.

The following Table 8 shows an example of a frame according to the values of b2, b3, and b4 in order to distinguish frames in case b0 and b1 are 11.

TABLE 8

| subfield value (b0, b1) | subfield value (b2, b3, b4) | Subfield description |
| --- | --- | --- |
| 11 | 000 | The subfield value is set to 11000 for indicating this frame is a beacon frame |
| 11 | 001 | The subfield value is set to 11001 for indicating this frame is a Probe response frame |
| 11 | 010 | The subfield value is set to 11010 for indicating this frame is a STA advertising frame |
| 11 | 011 | The subfield value is set to 11011 for indicating this frame is a CTS frame |
| 11 | 100 | The subfield value is set to 11100 for indicating this frame is a ACK frame |
| 11 | 101 | The subfield value is set to 11101 for indicating this frame is a Block ACK frame |
| 11 | 110 | The subfield value is set to 11110 for indicating this frame is a Probe request frame |
| 11 | 111 | The subfield value is set to 11111 for indicating this frame is a Beam-forming Report poll frame |

Referring to Table 8, the management frame, for the bits of b0 to b4, may be mapped as follows: 11000 (beacon frame), 11001 (probe request frame), 11010 (STA advertising frame), 11011 (CST frame), 11100 (ACK frame), 11101 (block ACK frame), 11110 (probe request frame), 11111 (beam-forming report poll frame). The bit-frame mapping relationship is arbitrary and may be modified.

When receiving a frame, b0 and b1 are demodulated to primarily classify the received frame, and b2, b3, and b4 are used to secondarily allow specific frame type to be known.

In contrast, in case a result of decoding b0 and b1 is 00, 01, or 10, they may be combined with b2, b3, and b4 and may be thereby construed as MCS value. In the case of 00, 01, or 10, they may be combined with b2, b3, and b4, and a binary number between 00000 and 01011 may be used to represent 12 different pieces of MCS information.

In other words, according to the present invention, a frame may be distinguished based on the bit information on the frame type positioned in the SIG. Based on the distinguished frame type, the value of a bit additionally provided in the SIG field may be construed differently.

According to an embodiment of the present invention, after interpreting b0 and b1, information contained in the remainder of the SIG may be construed differently. That is, information contained in the SIG, to be subsequently interpreted, in case the frame type is one of a beacon frame, probe response frame, STA advertising frame, CTS frame, ACK frame, block ACK frame, prove request frame or beam-forming report poll frame may differ from information contained in the SIG, to be subsequently interpreted, in case the frame type is not a beacon frame, probe response frame, STA advertising frame, CTS frame, ACK frame, block ACK frame, prove request frame or beam-forming report poll frame.

According to an embodiment, the beacon frame, probe response frame, STA advertising frame, CTS frame, a ACK frame, block ACK frame, prove request frame or beam-forming report poll frame is an example of frames distinguished as bit information and frame indicated may vary, and such embodiment also belongs to the scope of the present invention. Further, using five assigned bits is an example, and the number of bits used to indicate frame type information may vary.

Figure 8:
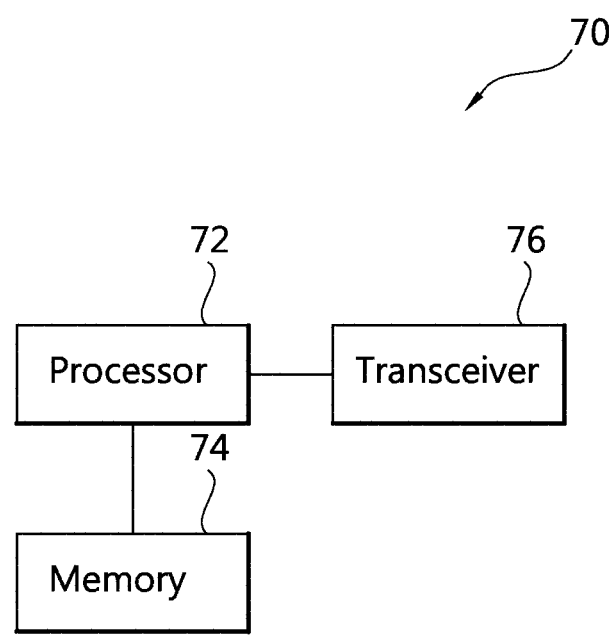
FIG. 8 is a block diagram illustrating a wireless device to which an embodiment of the present invention may apply.

FIG. 8 is a block diagram illustrating a wireless device to which an embodiment of the present invention may apply.

The wireless device 70 may be a terminal where the above-described embodiments may be implemented and may be an AP, non-AP, or STA (non-AP station).

The wireless device 70 includes a processor 72, a memory 74, and a transceiver 76. The transceiver 76 transmits/receives radio signals. The IEEE 802.11 physical layer is implemented in the transceiver 76. The processor 72 is operatively connected with the transceiver 76 and implements the IEEE 802.11 MAC layer and physical layer. The processor 72 may demodulate the frame type contained in the signal (SIG) of the physical layer convergence protocol (PLCP) header to obtain information indicating the physical service data unit (PSDU) of the frame and obtain frame information that is information necessary to demodulate the frame included in the SIG dependently in the information indicating the PSDU. That is, the processor 72 may be configured to implement the above-described embodiments.

The processor 72 and/or transceiver 76 may contain an ASIC (application-specific integrated circuit), other chipset, a logic circuit, and/or a data processing device. The memory 74 may include a ROM (read-only memory), a RAM (random access memory), a flash memory, a memory card, a storage medium, and/or other storage devices. When an embodiment is implemented in software, the above-described schemes may be realized in modules (procedures, or functions) performing the above-described operations. The modules may be stored in the memory 74 and may be executed by the processor 72. The memory 72 may be positioned in or outside the processor 72 and may be connected with the processor 72 via various known means.

What is claimed is:

1. A method for transmitting a data block in a wireless local area network, the method comprising:
generating, by a transmitter, a physical layer protocol data unit (PPDU) that includes a short training field, a long training field and a signal field; and
transmitting, by the transmitter, the PPDU to a receiver,
wherein the signal field includes a frame type field that indicates whether the PPDU is used to carry a null data packet (NDP) frame that does not have a data field,
wherein when the frame type field does not indicate that the PPDU is used to carry the NDP frame, the signal field includes a bandwidth field, a stream field, a modulation and coding scheme (MCS) field, and a coding type field, the bandwidth field indicating a bandwidth used for the PPDU, the stream field indicating a number of spatial streams used for the PPDU, the MCS field indicating a MCS index used for the PPDU, the coding type field indicating a type of channel coding used for the PPDU, and wherein when the frame type field indicates that the PPDU is used to carry the NDP frame, the signal field indicates a type of the NDP frame and does not include the MCS field.

2. The method of claim 1, wherein the PPDU is transmitted over 1 MHz bandwidth.

3. The method of claim 1, wherein each of the short training field, the long training field and the signal field is transmitted in two Orthogonal Frequency Division Multiplexing (OFDM) symbols.

4. The method of claim 1, wherein the receiver determines whether to stop receiving the PPDU based on the frame type field.

5. A device for transmitting a data block in a wireless local area network, the device comprising:

a transceiver that transmits and receives radio signals; and a processor, operatively coupled with the transceiver, that:

generates a physical layer protocol data unit (PPDU) that includes a short training field, a long training field and a signal field; and instructs the transceiver to transmit the PPDU to a receiver, wherein the signal field includes a frame type field that indicates whether the PPDU is used to carry a null data packet (NDP) frame that does not have a data field, wherein when the frame type field does not indicate that the PPDU is used to carry the NDP frame, the signal field includes a bandwidth field, a stream field, a modulation and coding scheme (MCS) field, and a coding type field, the bandwidth field indicating a bandwidth used for the PPDU, the stream field indicating a number of spatial streams used for the PPDU, the MCS field indicating a MCS index used for the PPDU, the coding type field indicating a type of channel coding used for the PPDU, wherein when the frame type field indicates that the PPDU is used to carry the NDP frame, the signal field indicates a type of the NDP frame and does not include the MCS field.

6. The device of claim 5, wherein the PPDU is transmitted over 1 MHz bandwidth.

7. The device of claim 5, wherein each of the short training field, the long training field and the signal field is transmitted in two Orthogonal Frequency Division Multiplexing (OFDM) symbols.

8. The device of claim 5, wherein the receiver determines whether to stop receiving the PPDU based on the frame type field.

* * * * *